United States Patent [19]

Bebermeier et al.

[11] Patent Number: 4,811,934
[45] Date of Patent: Mar. 14, 1989

[54] HYDRAULICALLY DAMPED RESILIENT MOUNTING

[75] Inventors: Jürgen Bebermeier; Werner Fischer; Jürgen Heitzig, all of Hanover; Günter Eberhard, Gehrden, all of Fed. Rep. of Germany

[73] Assignee: Continental Aktiengesellschaft, Hanover, Fed. Rep. of Germany

[21] Appl. No.: 170,671

[22] Filed: Mar. 17, 1988

Related U.S. Application Data

[63] Continuation of Ser. No. 888,857, Jul. 23, 1986, abandoned.

[30] Foreign Application Priority Data

Jul. 25, 1985 [DE] Fed. Rep. of Germany ....... 3526607

[51] Int. Cl.$^4$ .............................................. F16M 3/00
[52] U.S. Cl. .................... 267/140.1; 188/320
[58] Field of Search ............... 267/140.1, 35; 188/320

[56] References Cited

U.S. PATENT DOCUMENTS

| | | | |
|---|---|---|---|
| 4,469,316 | 9/1984 | van der Boom et al. | 267/140.1 |
| 4,483,521 | 11/1984 | Kakimoto | 267/140.1 X |
| 4,618,128 | 10/1986 | Hartel et al. | 188/320 X |

FOREIGN PATENT DOCUMENTS 3019337 11/1981 Fed. Rep. of Germany .
117930  7/1984 Japan ..................... 267/140.1

*Primary Examiner*—Joseph Falk
*Attorney, Agent, or Firm*—Becker & BEcker

[57] ABSTRACT

A hydraulically damped resilient mounting having a housing that is closed off on opposite sides by resilient elastomeric elements to form an interior of the housing. A partition is disposed in the housing between the resilient elastomeric elements in such a way as to divide the interior of the housing into two chambers that are filled with damping fluid. The partition is provided with a flow passage so that the volumes of the two chambers can be reciprocally varied. The flow passage includes a hollow chamber that forms a large portion of the surface area of the partition. The flow passage also includes an at least nearly tangentially disposed inlet, in the outer peripheral region of a partition, to provide communication between one of the two chambers and the hollow chamber. The flow passage further includes an at least nearly axially disposed outlet, in the central portion of the partition, to provide communication between the hollow chamber and the other of the two chambers.

5 Claims, 1 Drawing Sheet

HYDRAULICALLY DAMPED RESILIENT MOUNTING

This is a continuation of co-pending parent application U.S. Ser. No. 888,857-Bebermeier et al filed July 23, 1986 belonging to the assignee of the present invention and now abandoned as replaced with the present continuation application.

BACKGROUND OF THE INVENTION

1. Field of the Invention

The present invention relates to a hydraulically damped resilient mounting for motors, machines, equipment, etc., especially for the engine of a motor vehicle.

2. Description of the Prior Art

In addition to providing a good damping in the fundamental frequency range of the system, the purpose of resiliently mounting vibrating masses is to also effectively reduce noise, even above the fundamental frequency. Since both of these requirements cannot be satisfactorily fulfilled with a purely resilient elastomeric mounting, it has become customary practice to associate a hydraulic dampening mechanism with the customary elastomeric mountings, and to considerably improve the damping that can be achieved by taking advantage of the Tilger effect of a fluid column that surges between two chambers of the housing of the mounting. A number of such hydraulically damped elastomeric mountings are known. It has been shown to be advantageous to embody the flow passage between the chambers, which flow passage generally includes a restrictor, with as great a ratio of length to cross-sectional width as possible in order with the dynamic processes to be able to favorably influence a wide frequency spectrum about the fluid flow, which surges at a high rate of speed and with rapid changes in direction. For this purpose, pursuant to one heretofore known proposal (German Offenlegungsschrift No. 30 19 337 Hamaekers et al dated Nov. 26, 1981, corresponding to U.S. Pat. No. 4,422,779-Hamaekers et al dated Sept. 27, 1983), the flow passage is embodied as a spiral recess that is formed in the partition and has tangential outlet openings that open into the two chambers on both sides. Although this construction functions well but can be produced only at relatively great expense due to the mechanical machining that is required.

It is therefore an object of the present invention to achieve, with considerably reduced structural complexity, a damping for elastic mounting systems that is at least equivalent to the damping of the heretofore known systems.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
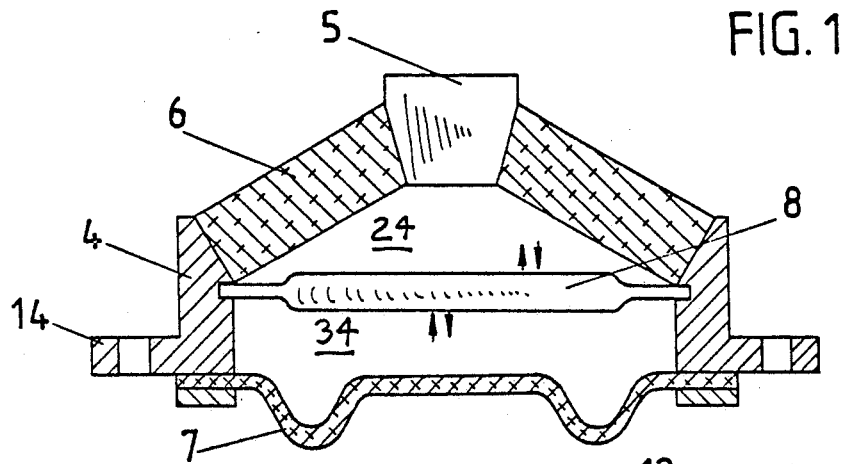
FIG. 1 is a cross-sectional view of one inventive embodiment of a motor mount.

The hydraulically damped resilient mounting of the present invention comprises: a housing that is closed off on opposite sides by resilient elastomeric elements to form an interior of the housing; and a partition that is disposed in the housing, between the resilient elastomeric elements, in such a way as to divide the interior of the housing into two chambers that are filled with damping fluid, with the partition being provided with flow passage means, so that the volumes of the two chambers can be reciprocally varied; the flow passage means includes a hollow chamber that forms a large portion of the surface area of the partition, with the flow passage means also including at least nearly tangentially disposed inlet means, in the outer peripheral region of the partition, to provide communication between one of the two chambers and the hollow chamber, and further including at least nearly axially disposed outlet means, in the central portion of the partition, to provide communication between the hollow chamber and the other of the two chambers.

The hollow chamber can be formed by a container-like recessed portion in the cross-sectional area of the partition, with this recessed portion being closed off by a cover that is secured to the partition. Pursuant to a further embodiment of the present invention, the inlet means for the damping fluid can expediently include a peripheral channel means that extends helically over a portion of the periphery of the hollow chamber and opens into the latter approximately tangentially. The inlet means expediently further includes an opening in the cover of the partition, with the opening providing communication between the channel means and said one of the two housing chambers. The cover of the partition, and hence the opening in the cover, can face said one of the two housing chambers. In addition, the outlet means can be a hole provided in that central portion of the partition that is removed from said chamber and faces the other of the two chambers.

The present invention achieves the desired Tilger effect of the damping device with surprisingly straightforward means. In place of a helical or similarly extending bore that is expensive to provide and practically always necessitates a two-part construction of the partition, a single self-contained chamber is provided that is much easier to furnish due to its hollow cylindrical shape. This chamber forms the essential element of the flow passage for the damping fluid. Due to the special arrangement, on both sides, of openings that are open to the two chambers of the housing, the hollow chamber imparts to the damping fluid a rotational movement having a helically tapering course from the periphery toward the center of the chamber; a similar situation exists in the opposite direction. The volume of the hollow chamber, which in comparison with, for example, a bore is relatively great, results in the displacement of relatively great quantities of fluid at high rates of flow, and forms the basis for the improved damping that can be achieved as the final result.

Further specific features of the present invention will be described in detail subsequently.

DESCRIPTION OF PREFERRED EMBODIMENTS

Referring now to the drawing in detail, the mounting illustrated in FIG. 1 comprises an annular housing 4 that is provided with an attachment flange 14 and a connector 5, both of which are resiliently supported relative to one another by a truncated-cone-shaped rubber shock absorber 6 that is securely connected to the two. In the installed state, the attachment flange 14 of the mounting housing is securely attached to a supporting part of a non-illustrated vehicle, while the connector 5 serves to receive part of the motor load. The housing 4 is closed off at the top by the rubber shock absorber 6, and is closed off at the bottom by a flexible diaphragm-like element 7. The interior of the housing 4, which is completely filled with a highly viscous damping fluid, is divided into two chambers 24, 34 by means of a rigid partition 8 that is disposed with axial play in the walls of the housing. The two chambers 24, 34 are constantly in communication with each other via a partially throttled flow passage through the partition 8, with this flow passage being indicated in the drawing by directional arrows.

The drawing represents a simplified illustration of the functional principle of a hydraulically damped resilient motor mount: when the rubber shock absorber 6 deflects inwardly, damping fluid is forced out of the chamber 24 into the lower chamber 34, the volume of which can also be changed due to the fact that the housing is closed off by the diaphragm 7. As a result of these changes in volume of the chambers 24, 34, the rheological parameters can be influenced by the design and dimensioning of the flow passage for the purpose of setting a favorable relationship between the damping that can be achieved and the desired reduction of noise. The subject matter of the present invention has to do with making the flow passage independent of other particulars of the respective mounting system.

Figure 3:
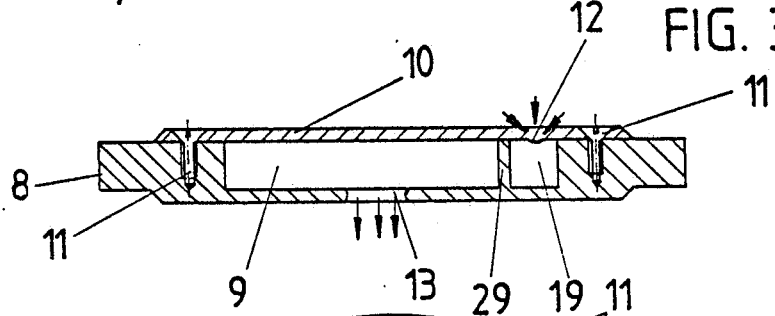
FIG. 3 is a cross-sectional view through the partition of FIG. 2.
Figure 2:
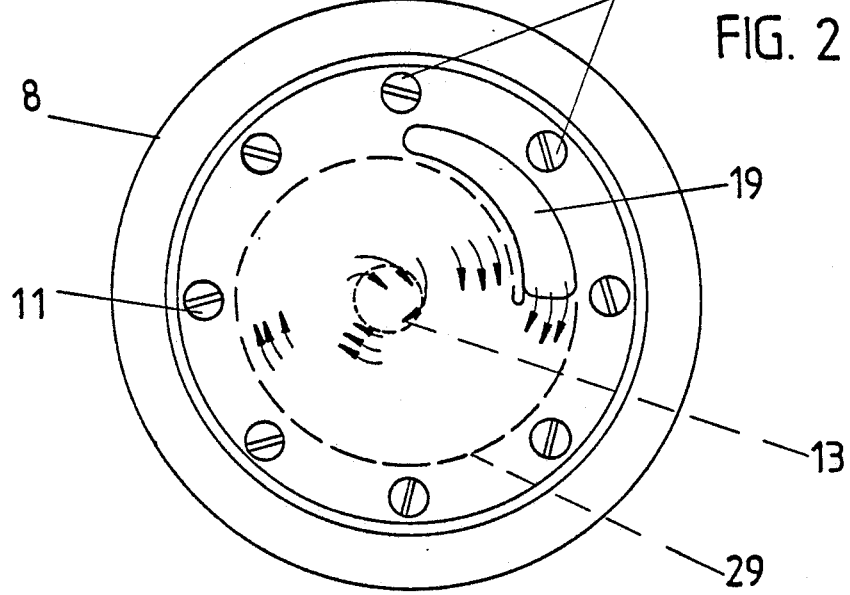
FIG. 2 is an enlarged plan view of the partition utilized in the mounting of FIG. 1.

As shown in FIG. 2 and 3, the partition 8 is provided wiht a cylindrical hollow chamber 9. This hollow chamber, which coincides with a large portion of the surface of the partition, is advantageously formed by a recess in the cross-sectional area of the partition, which is approximately in the shape of a round container. In the manufacturing phase, this recess is open, but is at a later stage closed off by a cover 10 that is sealingly secured to the partition 8 by screws 11. Via an opening 12 in the cover 10 along the outer periphery, the hollow chamber 9 communicates with the housing chamber 24; and via a central or just slightly off-center hole 13 in the lower surface of the partition, the hollow chamber 9 communicates with the chamber 34. The peripherally disposed recessed portion 19, the contour of which is approximately kidney-shaped, is adapted to the course of the wall of the hollow chamber, and opens in the tangential direction toward the interior of the chamber, so that the damping fluid that is forced through already from the beginning has imparted thereto an angular momentum for its free flow path. The tendency toward the desired spiral path of the flow can be increased even further by providing a worm-gear-like guide means 29.

The directional arrows in FIG. 2 and 3 indicate the movement of damping fluid from the chamber 24 into the chamber 34 when the mounting is displaced inwardly. When the mounting is displaced outwardly, corresponding procedures take place, although in the opposite direction.

The present invention is, of course, in no way restricted to the specific disclosure of the specification and drawing, but also encompasses any modifications within the scope of the appended claims.

What we claim is:

1. A hydraulically damped resilient mounting, comprising:
   a hollow cylindrical housing that is closed off on opposite sides by resilient elastomeric elements to form an interior of said housing; and
   a partition that has an outer peripheral surface provided by a first wall having a peripheral edge and a second wall arranged so that said first wall and said second wall are spaced apart with an interior volume being located between the walls and that is disposed in said housing, between said resilient elastomeric elements, in such a way as to divide said interior of said housing into a first chamber and a second chamber, which chambers are filled with damping fluid; said partition is provided with a means for directing flow including a flow passage chamber having an interior volume in the partition, so that the volumes of said first chamber and said second chamber can be reciprocally varied via said flow passage chamber; said flow passage chamber being formed by having the interior volume in the partition being an intermediate chamber that is located in said partition and that extends within a large portion of the interior volume of said partition; said flow passage chamber also includes a slot-shaped first opening, said first opening being disposed in the surface provided by said first wall of said partition near said peripheral edge of said first wall, which first wall is adjacent to said first chamber, to provide communication between said first chamber and said flow passage chamber, and further includes a second opening, disposed axially in a central portion of said second wall of said partition, which second wall is adjacent to said second chamber, to provide communication between said flow passage chamber and said second chamber, said first and second openings being the only existing openings included with said means for directing the flow.

2. A mounting according to claim 1, in which said passage chamber is formed by a container-like recessed portion in the cross-sectional area of said partition, with said recessed portion being closed off by a cover secured to said partition.

3. A mounting according to claim 2, in which said inlet means includes peripheral channel means that extends helically over a portion of the periphery of said passage chamber and opens into the hollow chamber tangentially; thereof and in which said inlet means further includes an opening in said cover of said partition, with said opening providing communication between said channel means and said first chamber.

4. A mounting according to claim 3, in which said cover of said partition faces said first chamber.

5. A mounting according to claim 4, in which said outlet means is a hole provided in that central portion of said partition that is remote from said first chamber and faces said second chamber.

* * * * *